(12) United States Patent
Knechtel et al.

(10) Patent No.: US 10,760,320 B2
(45) Date of Patent: Sep. 1, 2020

(54) DOOR DRIVE FOR A MOTOR VEHICLE DOOR

(71) Applicant: Bayerische Motoren Werke Aktiengesellschaft, Munich (DE)

(72) Inventors: Marcus Knechtel, Kirchheim (DE); Andreas Laemmerhofer, Munich (DE); Manuel Wernicke, Dachau (DE)

(73) Assignee: Bayerisch Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/210,736

(22) Filed: Dec. 5, 2018

(65) Prior Publication Data

US 2019/0106923 A1    Apr. 11, 2019

Related U.S. Application Data

(63) Continuation of application No. PCT/EP2017/063464, filed on Jun. 2, 2017.

(30) Foreign Application Priority Data

Jun. 9, 2016   (DE) .................. 10 2016 210 168

(51) Int. Cl.
   *E05F 15/63*    (2015.01)
   *E05F 15/53*    (2015.01)
   (Continued)

(52) U.S. Cl.
   CPC ............. *E05F 15/63* (2015.01); *B60J 5/04* (2013.01); *E05F 15/00* (2013.01); *E05F 15/53* (2015.01); *E05Y 2900/531* (2013.01)

(58) Field of Classification Search
   None
   See application file for complete search history.

(56) References Cited

U.S. PATENT DOCUMENTS 3,718,171 A * 2/1973 Godwin ............... B64C 1/1415
                                                           160/210
4,689,849 A * 9/1987 Eger ..................... E05C 17/305
                                                             16/58

(Continued)

FOREIGN PATENT DOCUMENTS

DE        1940635 A1 *   7/1971   ............. E05F 15/53
DE      35 19 203 A1     7/1986

(Continued)

OTHER PUBLICATIONS

International Search Report (PCT/ISA/210) issued in PCT Application No. PCT/EP2017/063464 dated Sep. 7, 2017 with English translation (four (4) pages).

(Continued)

*Primary Examiner* — Marcus Menezes
(74) *Attorney, Agent, or Firm* — Crowell & Moring LLP

(57) ABSTRACT

A door drive for a motor vehicle door has a lever element which can be mounted on the body work side of the motor vehicle and which can be connected to an adjustable drive element of a drive device arranged on the motor vehicle door. The adjustable drive element is designed as a rocker element which can be mounted about a bearing axis and which includes a first lever arm by which the rocker element is at least indirectly connected to an actuator of the drive device, and also includes a second lever element by which the rocker element is connected at least indirectly to the lever element.

9 Claims, 6 Drawing Sheets

(51) Int. Cl.
*B60J 5/04* (2006.01)
*E05F 15/00* (2015.01)

(56) References Cited

U.S. PATENT DOCUMENTS

| | | | | |
|---|---|---|---|---|
| 5,332,279 | A * | 7/1994 | Golemis | B60J 5/0497 |
| | | | | 192/69.6 |
| 5,468,042 | A * | 11/1995 | Heinrichs | E05C 17/305 |
| | | | | 16/51 |
| 6,283,535 | B1 * | 9/2001 | Yuge | E05F 15/63 |
| | | | | 296/146.1 |
| 6,305,737 | B1 * | 10/2001 | Corder | B60J 5/0479 |
| | | | | 296/146.11 |
| 2004/0244294 | A1 | 12/2004 | Schachtl | |
| 2005/0067853 | A1 * | 3/2005 | Krajenke | B60J 7/205 |
| | | | | 296/76 |
| 2005/0127711 | A1 * | 6/2005 | Rigorth | E05F 15/63 |
| | | | | 296/146.4 |
| 2011/0266296 | A1 * | 11/2011 | Curotto | B65F 1/1638 |
| | | | | 220/810 |
| 2017/0089112 | A1 * | 3/2017 | Rosales | B62D 33/037 |
| 2017/0211308 | A1 * | 7/2017 | Kitamura | E05F 15/63 |

FOREIGN PATENT DOCUMENTS

| | | | | |
|---|---|---|---|---|
| DE | 20004973 U1 * | 6/2000 | ............ | E05F 15/619 |
| DE | 101 52 696 B4 | 11/2012 | | |
| DE | 102018211256 A1 * | 11/2019 | ............. | E05F 15/53 |
| EP | 0 580 147 A1 | 1/1994 | | |
| EP | 1 419 916 A1 | 5/2004 | | |
| GB | 2505739 A | 3/2014 | | |
| JP | 04157244 A * | 5/1992 | ............. | E05F 15/63 |
| WO | WO 2015/048876 A1 | 4/2015 | | |

OTHER PUBLICATIONS

German-language Written Opinion (PCT/ISA/237) issued in PCT Application No. PCT/EP2017/063464 dated Sep. 7, 2017 (five (5) pages).

German Search Report issued in counterpart German Application No. 10 2016 210 168.4 dated Jan. 20, 2017 with partial English translation (12 pages).

* cited by examiner

DOOR DRIVE FOR A MOTOR VEHICLE DOOR

CROSS REFERENCE TO RELATED APPLICATIONS

This application is a continuation of PCT International Application No. PCT/EP2017/063464, filed Jun. 2, 2017, which claims priority under 35 U.S.C. § 119 from German Patent Application No. 10 2016 210 168.4, filed Jun. 9, 2016, the entire disclosures of which are herein expressly incorporated by reference.

BACKGROUND AND SUMMARY OF THE INVENTION

The invention relates to a door drive for a motor vehicle door. Furthermore, the invention relates to such a motor vehicle door.

The side doors of the vast majority of motor vehicles which are to be found nowadays in road traffic are still opened and closed manually. In order to assist and limit a respective opening movement, in this context usually arrestor straps are used which are of differing designs and have respective sliding block guides which are mounted with one of their ends on a corresponding door pillar to which the side door is fastened and which interact with a usually spring-supported ball element or roller element which is attached to the door shell side and which rolls on the sliding block guide of the arrestor strap. As a result corresponding intermediate positions and final positions during the opening of the motor vehicle door can be latched.

In order to be able to avoid the collision of the motor vehicle door with an obstacle, for example an adjacently parked motor vehicle, there are already various approaches for limiting the opening swinging movement of the respective motor vehicle door. In this context, use is also made, for example, of combinations of arrestor straps with corresponding actuators which are, for example, sensor-controlled.

In addition to these possibilities for limiting the opening swinging movement, door drives by means of which not only the swinging range of the respective motor vehicle door can be limited but also at least the opening movement thereof, and if appropriate also the closing movement thereof, takes place in a driven fashion, have now become established, in particular in executive motor vehicles. An example of such a door drive is known from WO 2015/048876 A1, in which a lever element of an arrestor strap type is mounted, on the one hand, on a door pillar to which the motor vehicle door is fastened, and which is connected, on the other hand, to an adjustable drive element of a drive device which is arranged on the motor vehicle door. This drive element is formed by a gearwheel which meshes with the lever element or arrestor strap. Owing to the installation space conditions within the motor vehicle door, the drive device must, however, be arranged either directly on a frame element which adjoins the door pillar to which the motor vehicle door is fastened, or else said drive device must be provided at a short distance from this frame element. As a result, during opening and closing very high torques and forces are produced which act on the drive device. This gives rise to high mechanical loading and generation of noise, as well as to imprecise movement of the motor vehicle door.

A similar problem also arises in other known door drives which are all arranged within the door shell near to the frame element thereof which adjoins the door pillar to which the motor vehicle door is fastened.

The object of the present invention is therefore to provide a door drive and a side door of the type mentioned at the beginning, by means of which door drive and side door a much more precise and quieter adjustment of the motor vehicle door can be implemented.

This and other objects are achieved by a door drive and a motor vehicle door in accordance with embodiments of the invention.

The door drive mentioned at the beginning is distinguished according to the invention by the fact that the drive element of the drive device, which drive element extends at least indirectly with the lever element between the motor vehicle shell, in particular a respective door pillar, and the motor vehicle door, is embodied as a rocker element which can be moved about a bearing axis which comprises a first lever arm via which the rocker element is at least indirectly connected to an actuator of the drive device, and a second lever arm by means of which the rocker element is at least indirectly connected to the lever element. By providing this rocker element according to the invention it is possible according to the invention to make much better use of the installation space which is available within the motor vehicle door, with the result that in contrast to the previous prior art, not only can the drive device be arranged directly next to the frame element of the door shell which adjoins the door pillar to which the motor door is fastened, but also regions, for example on the outside or inside of a window device of the motor vehicle door can instead also be used for the arrangement of respective components of the drive device and, in particular, for use as swinging regions of the respective lever arms of the rocker element. By means of the better use of the free installation space within the motor vehicle door which is achieved in this way, it is possible to use correspondingly longer lever arms of the rocker element and of the other components of the drive device to carry out the adjustment of the motor vehicle door. The relatively long lever arms therefore permit smaller adjustment forces within the drive device, with the result that overall, in addition to other advantages, in particular a more precise adjustment or limitation of the opening movement as well as overall quieter adjustment of the motor vehicle door can be implemented.

The rocker element can be dimensioned and arranged advantageously here in such a way that favorable forces and torques as well as precise movement speeds of the motor vehicle door and an associated position detection process of obstacles in the opening region of the door can be implemented.

In addition to the actual drive, which comprises at least the outward movement and preferably also the closing movement, the drive device can also easily implement respective limitation of the opening movement of the motor vehicle door.

A further advantage of the door drive according to the invention is that it can easily be structurally integrated into an already existing motor vehicle door with a conventional arrestor strap. This means that the door drive can, for example, easily be used as a special equipment item in series-produced vehicles.

In a further refinement of the invention, the drive device serves both to open and to close the motor vehicle door. This permits, in a particularly comfortable fashion, the automatic control and movement of the motor vehicle door, for example by means of a gesture control or the like. In this context it is, in particular, also advantageous if the opening movement of the motor vehicle door is limited by means of the drive device before an obstacle is reached or impacted against, and therefore consequently the door drive also serves as a stop.

A further advantageous refinement of the invention provides that the bearing axle of the rocker element extends in the transverse direction of the motor vehicle door. The two bearing arms of the rocker element can therefore be dimensioned in a particularly favorable and correspondingly long fashion, with the result that forces and torques which are to be transmitted can preferably be kept relatively small and adjustment of the door can take place in a very accurate fashion.

In a further refinement of the invention, the first and the second lever arm of the rocker element are arranged offset with respect to one another, by a distance in the transverse direction of the motor vehicle door, at least with their respective bearing point, on the one hand, toward the lever element and, on the other hand, toward the actuator. By means of this offset, the respective lever arms can be implemented within different swinging regions or respective free installation spaces within the motor vehicle door. Therefore, despite sufficiently long lever arms, the free installation spaces within the motor vehicle door are utilized favorably.

In a further refinement of the invention, said distance between the two lever arms in the transverse direction of the motor vehicle door is matched to a width of a side window device of the motor vehicle door. Therefore, one of the lever arms may advantageously be moved in front of the side door device and the other of the lever arms can advantageously be moved behind the side window device in correspondingly free installation spaces of the motor vehicle door, without a collision occurring with the side window device during this swinging movement. As a result, it is again possible to select particularly favorable and long lever arms of the rocker element even though there is a side window device, which usually comprises a side window and at least one associated guide and/or associated drive elements.

Said distance can be generated here, for example, in two different ways: on the one hand, the distance can be generated by an axle stub in the region of the bearing axis of the rocker element, by means of which axle stub the two lever arms are spaced apart from one another. On the other hand, said distance can be generated by a lever arm region, running laterally in the transverse direction of the door, of at least one of the two lever arms of the rocker element. Both technical configurations provide here again the advantage that free installation spaces within the motor vehicle door can be used particularly favorably.

The invention also includes a motor vehicle door with a door drive as claimed in one of the patent claims described above, wherein the advantages of such a motor vehicle door result directly from the previously described advantages of the door drive.

In a further refinement of the invention, the motor vehicle door is distinguished by the fact that the rocker element is attached to a frame element of the door shell, which is arranged opposite a door pillar to which the motor vehicle door is fastened. As a result, this rocker element, or the bearing axis thereof, can be positioned in an optimum way in a free installation space, wherein favorable lever ratios can additionally be implemented.

Finally, it has proven advantageous if a through-opening for the lever element in the frame element, lying opposite the door pillar, of the door shell is provided in a central region of the hinge arrangement thereof, in particular in the central region between two hinges. This through-guidance of the lever element has proven particularly advantageous in so far as in this way forces which act on the lever element from the drive device are particularly favorably transmitted to both hinges or centrally to the hinge arrangement, with the result that for example the motor vehicle door does not lift up during its movement as a result of a corresponding application of force by the drive device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
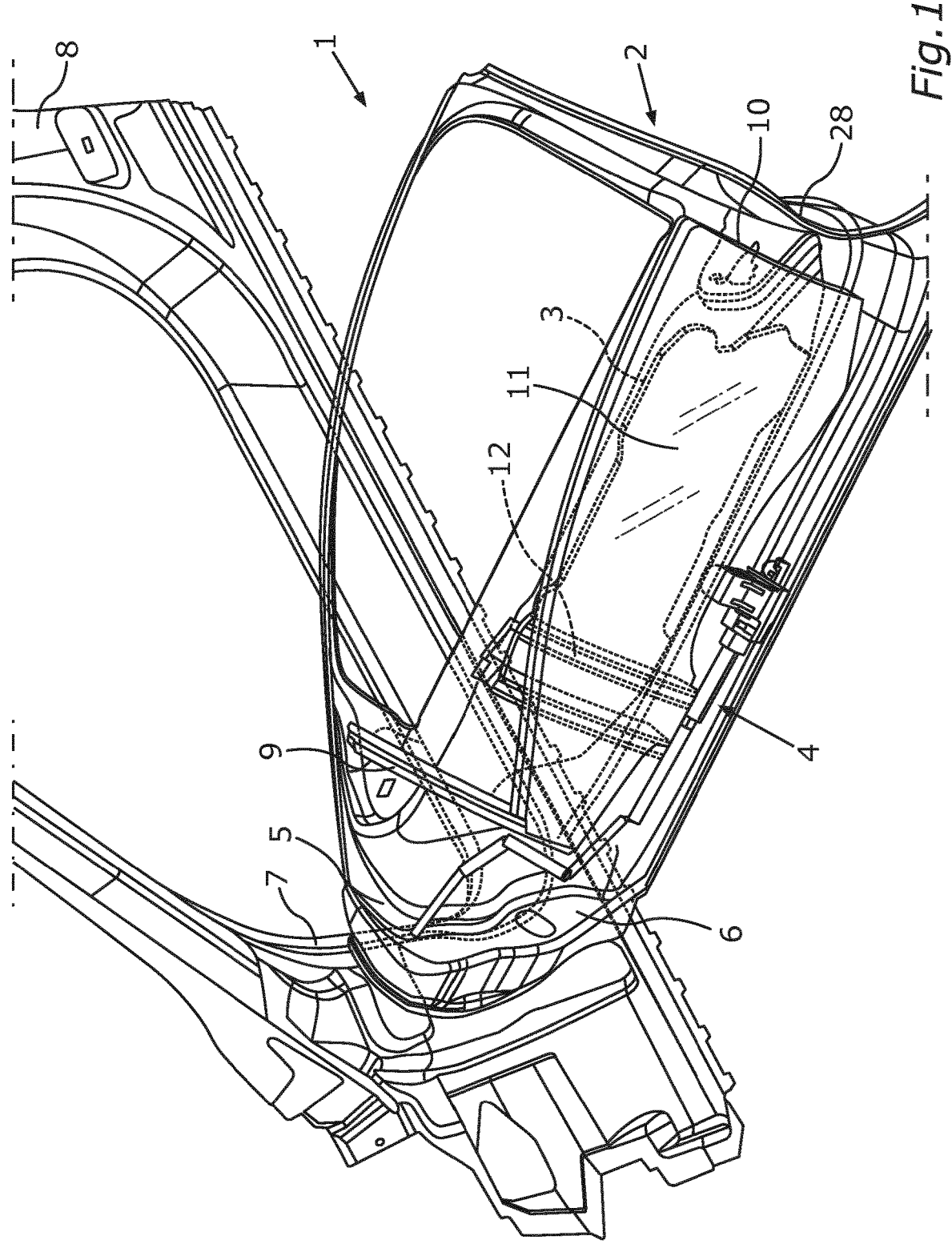
FIG. 1 is a perspective view of a detail of a door shell of a motor vehicle door which is embodied as a side door and which is fastened in a swinging fashion to a door pillar, embodied as an A pillar, of a side wall of a passenger motor vehicle and which comprises a door drive according to a first embodiment.

FIG. 1 illustrates essentially a door shell 2, a side window device 3 and a door drive 4 according to a first embodiment, in a perspective view of the detail of a motor vehicle door 1, which in the present case is a front left-hand side door of a passenger motor vehicle.

The door shell 2 comprises here, inter alia, a front frame element 15, by means of which the motor vehicle door 1 is mounted in a swinging fashion on the motor vehicle shell side, on an associated A pillar as a door pillar 7 of a side wall 8, by means of a hinge arrangement with an upper and a lower hinge, respective attachment points 5 and 6 of which can be seen in FIG. 1.

The side window device 3 of the motor vehicle door 1 comprises, in the present case, a front and a rear guide rail 9, 10, along which a side window 11 can be slid between an open position (illustrated here) and a closed position by means of a lifting device 12 which is partially shown here.

Figure 2:
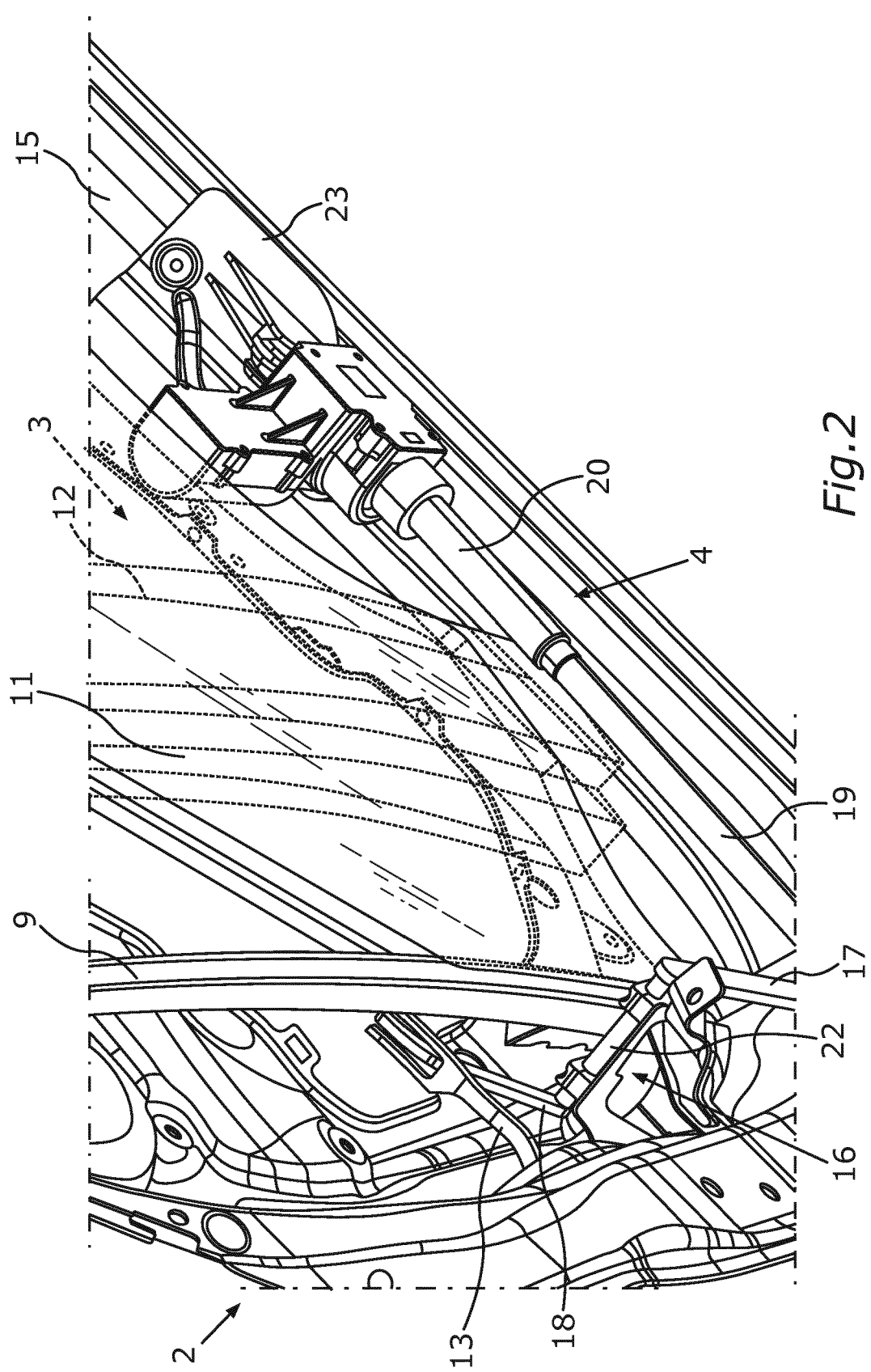
FIG. 2 is a perspective view of a detail of the door drive of the side door according to FIG. 1, wherein a side window device can be seen in the front region in addition to the door shell.
Figure 3:
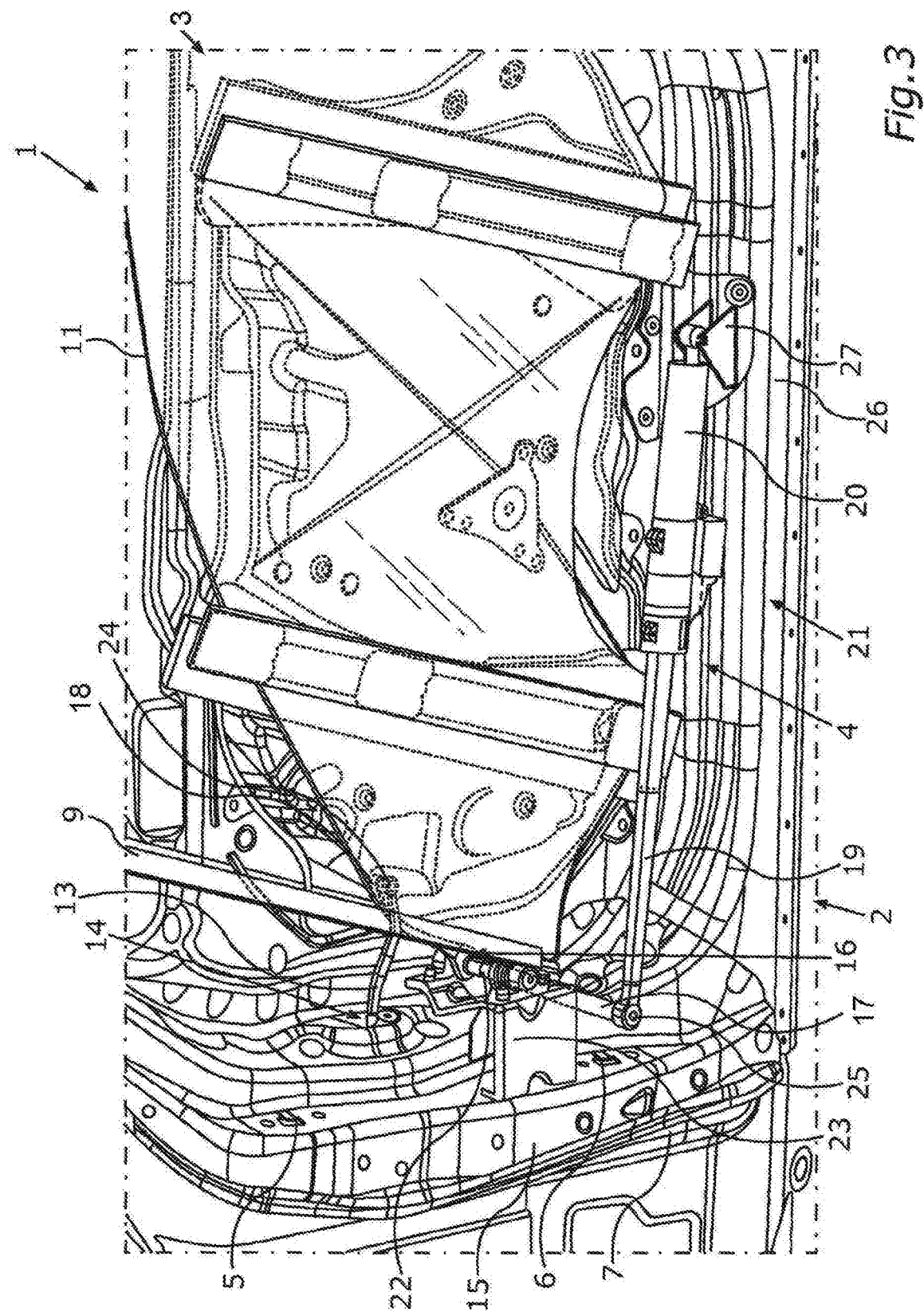
FIG. 3 is a side view of a detail, in a slightly perspective fashion, of the motor vehicle door with the door drive according to the first embodiment.
Figure 4:
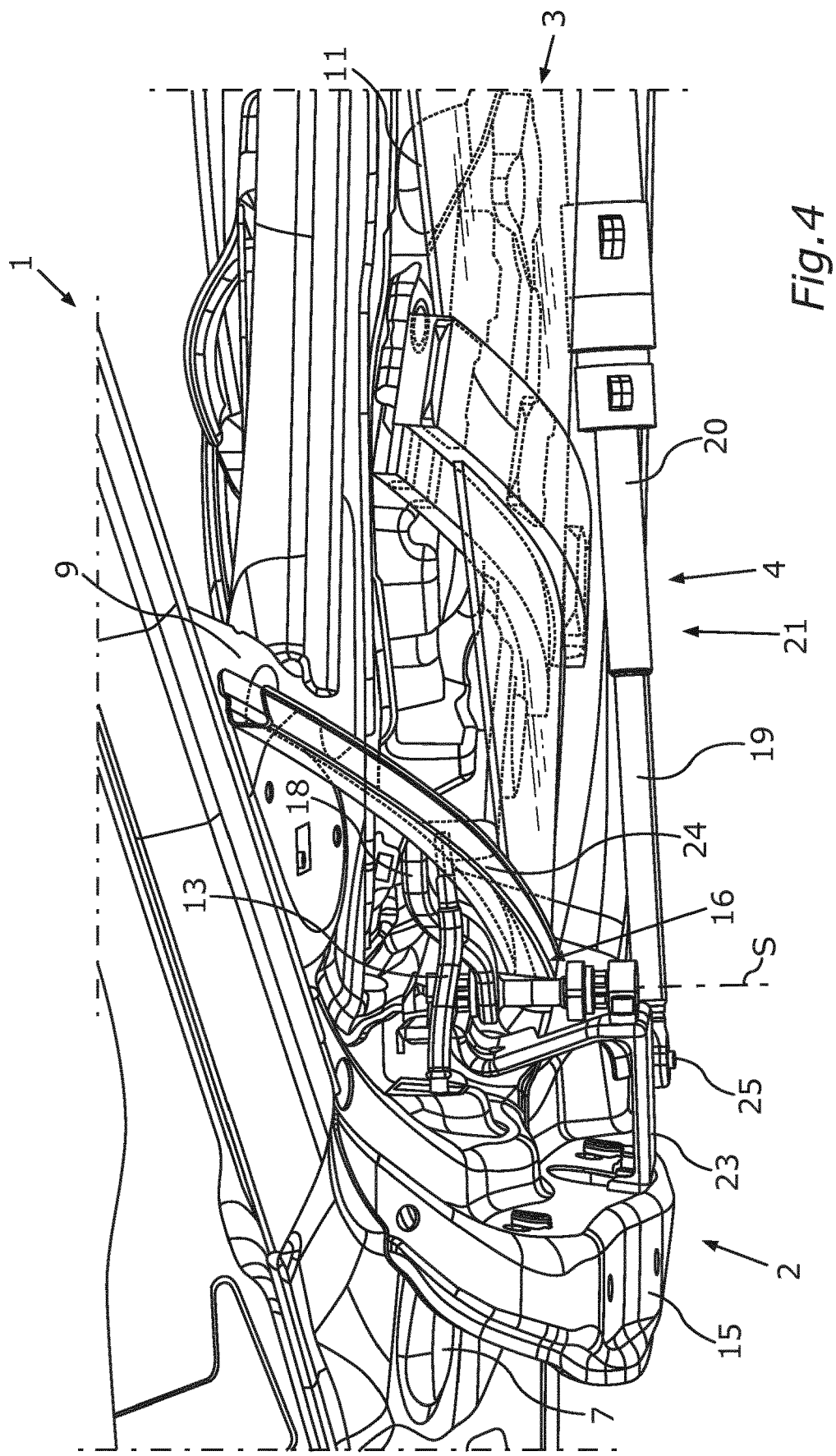
FIG. 4 is a perspective plan view of the motor vehicle door with the door drive, also according to the first embodiment, wherein, in particular, the position of the door drive with respect to the side window device of the motor vehicle door can be seen.

The door drive 4 will be explained below with reference to FIGS. 2 to 4, by means of which door drive 4 the side door 1 can be automatically adjusted between a closed position which is shown in FIGS. 2 to 4 and the open position shown in FIG. 1, or whose opening swinging movement can be limited.

The door drive 4 comprises for this purpose firstly a lever element 13, which is embodied in the manner of an arrestor strap of a conventional, non-driven door, and, on the one hand, is in fact mounted with a front end (which can only be seen in FIG. 1) on the A pillar 7. This can be done, for example, by means of a bearing block which is connected to the lever element 13 via a ball bearing eyelet or some other type of bearing arrangement which has corresponding degrees of freedom. In order to connect the lever element 13, which is arranged essentially in the interior of the motor vehicle door 1, to the door pillar 7 thereof, a through-opening 14 is provided in the frame element 15, more details on which through-opening 15 will be given later.

On the other hand, at the opposite end the lever element 13 is connected to an adjustable drive element in the form of a rocker element 16. This rocker element 16 comprises here two lever arms 17, 18 and can be moved about a swinging axis S. By means of the first lever element 17, the rocker element 16 is coupled at least indirectly, specifically via a rod 19, to an actuator 20, explained in more detail below, of a drive device 21. By means of the second lever element 18, the rocker element 16 is coupled directly to the lever element 13 here, wherein, if appropriate, a further lever or the like could be connected between them here. In the present first exemplary embodiment of the door drive 4, the two lever arms 17, 18 are connected to one another in a rotationally fixed fashion by means of an axle stub 22 in the region of the bearing axis S. In this context, the lever arms 17, 18 and the axle stub 22 can be embodied in one or more parts.

As is apparent, in particular, from FIG. 3, the rocker element 16 is attached to the frame element 15 of the door shell 2 by means of a bearing block 23. The bearing axis S runs here in the transverse direction of the motor vehicle door 1. It is to be borne in mind here that the transverse direction of the motor vehicle door 1 extends, by analogy with the vehicle network indicated in FIG. 2, with its outside at least essentially in the longitudinal direction of the vehicle (x direction) and in the vertical direction of the vehicle (z direction) and toward the center of the vehicle in the transverse direction of the vehicle (y direction). The bearing axis S of the rocker element 16 must not necessarily extend in parallel with the y direction here but instead angular arrangements with respect to the y direction in the region up to approximately 30° could also be selected.

It is also apparent from FIG. 3 that the second lever arm 18 of the rocker element 16 extends upward as far as a bearing point 24, to which said second lever arm 18 is connected to the lever element 13, for example, by means of a ball bearing eyelet or the like. Both the second lever arm 18 and the lever element 13 extend here with a respective region near to the bearing point 24 on the inside of the front guide rail 9 and the side window 11 of the side window device 3.

On the other hand, the first lever arm 17 of the rocker element 16 extends on the outside of the window device 3. This applies likewise to the actuator 20 and the rod 19, which is connected to the first lever arm 17 in the region of a bearing point 24.

Therefore, it is apparent, in particular, from FIGS. 2 and 3 that as a result of the axle stub 22 a distance is provided between the two lever arms 17, 18 of the rocker element 16 which has larger dimensions than the width of the side window device 3. Therefore, a swinging region of the lever element 13 with the lever arm 18 can be used in an installation space of the motor vehicle door 1 on the inside of the side window device 3 and through the first lever arm 17 with the rod 18 and the actuator 20 on the outside of the side window device 3. The distance between the lever arms 17, 18 and also between their respective bearing points 24, 25 in the transverse direction of the motor vehicle door 1 therefore ensures that corresponding installation space regions within the motor vehicle door 1 on the inside and the outside of the side door device 3 can be used if the rocker element 16 is moved as a result of a movement of the drive device 21.

From FIGS. 2 to 4 it is also clearly apparent that the actuator 20 which is arranged on the outside of the side window device 3 is mounted in the present case on a lower frame element 26 of the door shell 2 by means of a bearing strut 27. If appropriate, it would also be conceivable to mount the actuator 20 on a rear frame element 28 (shown in FIG. 1) of the door shell 2.

The actuator 20 is in the present case an electric actuator motor or stepping motor. However, it is to be noted that instead of this electric stepping motor it is also possible to use another drive, for example a hydraulic or a pneumatic drive, in particular a linear drive.

In the present case, a linear movement of the rod 19 of the actuator is carried out by means of corresponding energization. As a result, the rod 19 is retracted and extended essentially in the longitudinal direction of the motor vehicle door 1, forward or rearward essentially in the longitudinal direction of the motor vehicle door 1 or in the x direction. As a result of this movement, the rocker element 16 is correspondingly moved about the bearing axis S, which ultimately gives rise, via the lever arm 18, to a movement of the bearing point 24 with the lever element 13. Since the rocker element 16 is secured fixedly to the door shell by means of the bearing strut 23, a corresponding movement of the bearing point 24 becomes a swinging movement of the motor vehicle door 1. If the rod 19 is accordingly retracted in the direction of the actuator 20, this gives rise to a corresponding opening swinging movement of the motor vehicle door 1. Conversely, if the rod 19 is extended forward from the actuator 20 in the longitudinal direction of the door or in the x direction, this causes the motor vehicle door 1 to close.

In order to perform further functions, the linear stepping motor or actuator 20 is connected in the present case, for example, to a surrounding sensor system of the motor vehicle door 1 by means of which, in particular, obstacles during the opening or swinging out of the motor vehicle door 1 can be detected, with the result that the actuator 20 functions promptly as a door brake or stop. Conversely, during the closing of the door, the actuator 20 also acts in good time as a door brake before the closed position is reached, or the closing movement is slowed in good time.

In addition, the actuator 20 can assist, in the manner of a servo-assistance, an opening movement or closing movement which is carried out manually by a person, with the result that these movements take place, for example, extremely easily. Such a function can be brought about, for example, by means of permanent magnets which are provided in the region of the stepping motor 20.

Furthermore, a wide variety of possible ways of initiating an opening or closing movement of the motor vehicle door 1 can be brought about by means of the drive device 21. For example, this can be done using a gesture control by means of which the actuator 20 is actuated or else by means of corresponding switches or the like.

A particular advantage of the door drive 4 is also that the through-opening 14 for the lever element 13 can preferably also be that opening through which an arrestor strap of a conventional motor vehicle door 1 without a door drive 4 is guided. It is therefore optionally possible to equip the motor vehicle door 1 with a conventional arrestor strap or with the door drive 4 shown here, without respective separate through-openings 14 having to be provided. Moreover, the identical sealing grommets can also be used, which sealing grommets seal, for example, the front frame element 15 all around against the associated door pillar 7 and the through-opening 15 and moreover ensure a reduction in noise.

By means of the rocker element 16 it is additionally possible to select the through-opening 14 in such a way that the latter is preferably located in a central region of the hinge arrangement of the motor vehicle door 14. In the present case, in which the attachment points 5 and 6 are provided for the respective hinges of the door, the through-opening 14 runs in this central region between the two hinges. This has the advantage that when corresponding forces are applied to the lever element 13 by means of the drive device 21, force is applied centrally to the hinge arrangement and also to the door shell, with the result that the latter is not distorted.

A further advantage of the rocker element 16 with the associated lever arms 17, 18 is that these can be selected to be correspondingly long, as can also the rod 19 and the actuator 20. Therefore, if large forces and torques are applied to the door shell 2, as is the case, for example, if the motor vehicle door 1 is pressed outward at the rear end in the region of the frame element 26, no excessive loads are produced on the components of the door drive 4.

Figure 5:
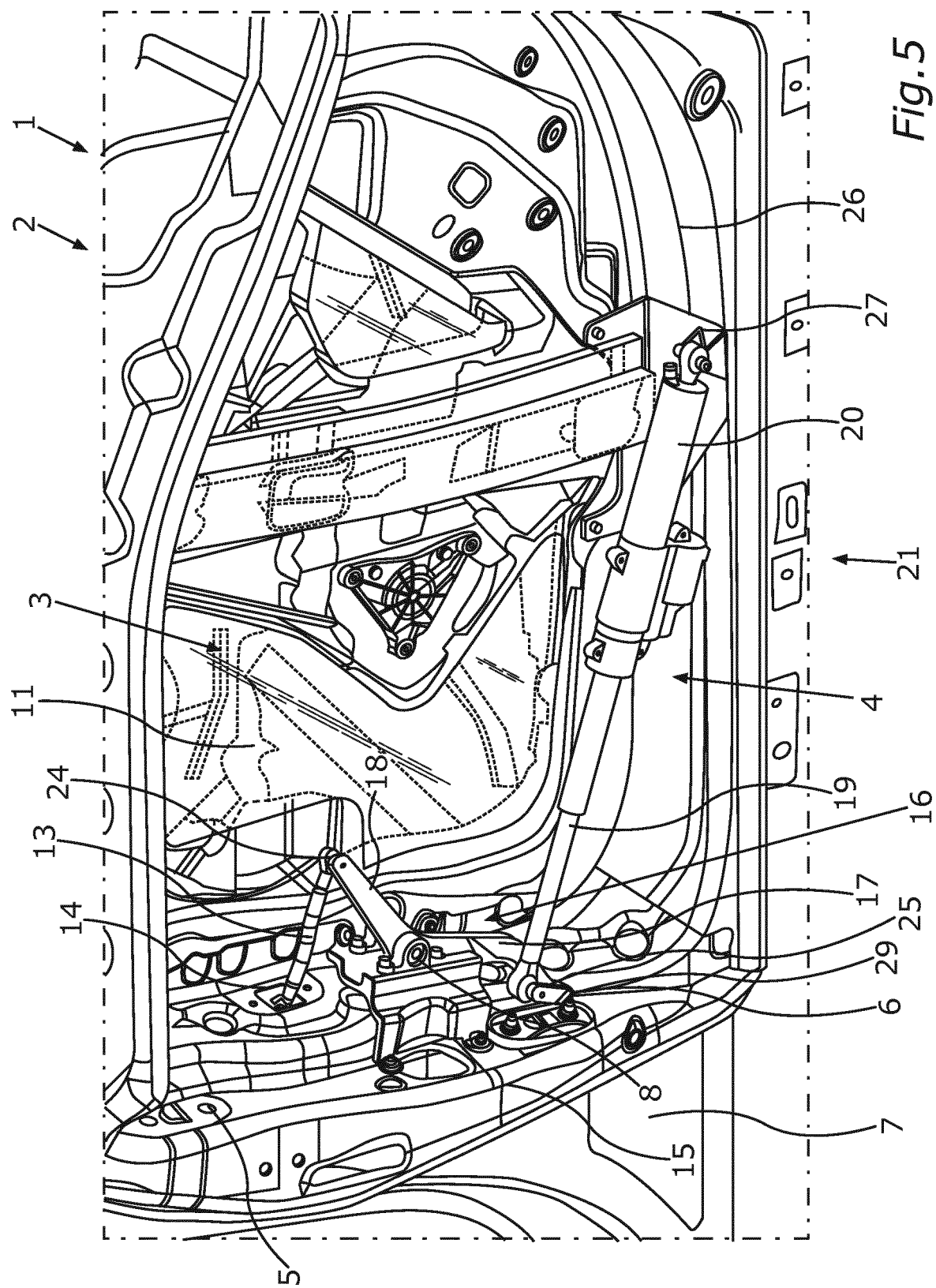
FIG. 5 is a perspective side view of a detail of a motor vehicle door which is embodied as a rear side door of a motor of a passenger motor vehicle, is fastened in a swinging fashion to an associated B pillar as a door pillar of a side wall, and which comprises a door drive according to a second embodiment of the invention.

Finally, FIG. 5 shows a perspective side view of a detail of the configuration of the door drive 4 which is modified compared to the embodiment according to FIGS. 1 to 4. Said door drive 4 is used in the present case with a motor vehicle door 1 which is embodied as a rear side door of a passenger motor vehicle. The motor vehicle door 1 in the present case is therefore mounted in a swinging fashion on a door pillar 7 in the form of a B pillar.

Since only essential and functional differences are explained below, it is to be assumed that all the other features of the door drive 4 correspond to those according to the first embodiment.

Figure 6:
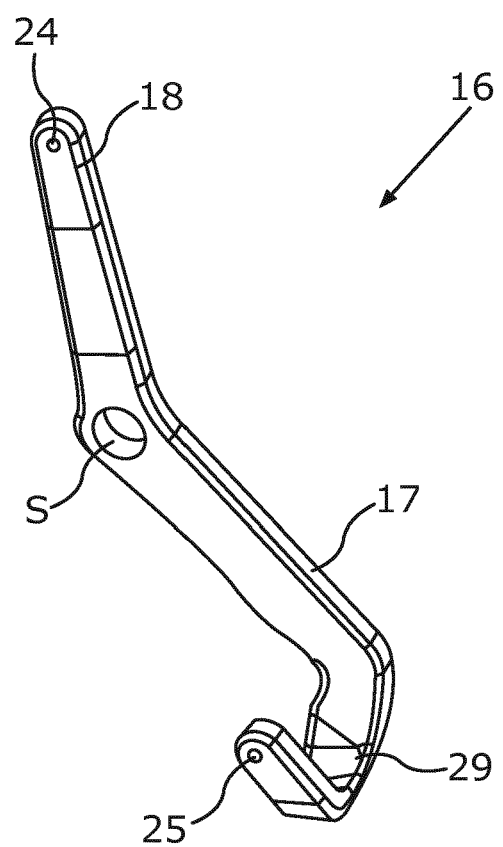
FIG. 6 is a perspective view of the rocker element of the drive device of the door drive according to the second embodiment.

As is apparent, in particular, from FIG. 5, the door drive 4 according to the second embodiment differs, in particular, by having a rocker element 16 which is configured in a different way than that according to the first embodiment. This rocker element 16 is illustrated once more in a separate perspective view in FIG. 6.

The essential difference with respect to the rocker element 16 according to the first embodiment is here that the distance between the respective bearing points 24, 25 of the corresponding lever arms 17, 18 is achieved in a different way, specifically not by means of the axle stub 22 but rather by means of a lever arm region 29, running in the lateral transverse direction of the door or in they direction, of the first lever arm 17 which moves out laterally in the transverse direction toward the outside, but otherwise is connected to the rod 19 in an identical way to the first exemplary embodiment. By means of the lever arm region 29, the lateral distance between the bearing points 24, 25 of the respective lever arms 18, 17 of the rocker element 16 is therefore again achieved, which distance is necessary for the first lever arm 17 to be able to run, together with the rod 19 and the actuator 20, on the outside of the corresponding side window device 3, and for the second lever arm 18 or the lever element 13 to be able to move on the opposite side, that is to say on the inside of the side window device 30, within associated free installation spaces of the motor vehicle door 1. The essential difference between the first and second embodiments of the door drive 4 is therefore the design of the rocker element 16, but it is ensured in an identical way that the lever arms 17, 18 can move inside or outside of the side window device 3 in free installation spaces of the motor vehicle door 1. Therefore, as a result, it is ensured, in an identical way to the exemplary embodiment according to FIG. 1, that the large installation spaces on the inside and the outside of the side window device can be used.

LIST OF REFERENCE SYMBOLS

1 Motor vehicle door
2 Door shell
3 Side window device
4 Door drive
5 Frame element
6 Attachment point
7 Door pillar
8 Side wall
9 Guide rail
10 Guide rail
11 Side window
12 Lifting device
13 Lever element
14 Through opening
15 Frame element
16 Rocker element
17 Lever arms
18 Lever arms
19 Rod
20 Actuator
21 Drive device
22 Axle stub
23 Bearing strut
24 Bearing point
25 Bearing point
26 Frame element
27 Bearing strut
28 Frame element
29 Lever arm region
30 Side window device
S Bearing axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A door drive for a motor vehicle door of a motor vehicle, comprising:
  a lever element which is mountable, at one end, on a shell side of the motor vehicle and which, at another end, is connected to an adjustable drive element of a drive device which is arranged on the motor vehicle door, wherein
  the adjustable drive element is a rocker element which is movable about a bearing axis and which comprises a first lever arm, via which the rocker element is at least indirectly connected to an actuator of the drive device, and a second lever arm by which the rocker element is at least indirectly connected to the lever element, the bearing axis of the rocker element extends in a transverse direction of the motor vehicle door, and at least a respective bearing point of the first lever arm with respect to the actuator and a respective bearing point of the second lever arm with respect to the lever element are arranged offset with respect to one another by a distance in the transverse direction of the motor vehicle door.

2. The door drive as claimed in claim 1, wherein
the drive device serves both to open and to close the motor vehicle door.

3. The door drive as claimed in claim 1, wherein
the distance between the two lever arms in the transverse direction of the motor vehicle door is matched to a width of a side window device of the motor vehicle door.

4. The door drive as claimed in claim 3, wherein
an axle stub is located in a region of the bearing axis of the rocker element, and the respective bearing points of the first and second lever arms are spaced apart from one another by the axle stub and the distance in the transverse direction of the motor vehicle door.

5. The door drive as claimed in claim 3, wherein
the distance in the transverse direction of the motor vehicle door of the bearing points of the two lever arms is generated by a lever arm region, running laterally in the transverse direction of the door, of at least one of the lever arms.

6. The door drive as claimed in claim 1, wherein
the distance in the transverse direction of the motor vehicle door of the bearing points of the two lever arms is generated by a lever arm region, running laterally in the transverse direction of the door, of at least one of the lever arms.

7. A motor vehicle door, comprising a door drive as claimed in claim 1.

8. The motor vehicle door as claimed in claim 7, wherein
the rocker element is attached to a frame element of a door shell, which is arranged opposite a door pillar to which the motor vehicle door is fastened.

9. The motor vehicle door as claimed in claim 8, wherein
a through opening for the lever element in the frame element, lying opposite the door pillar, of the door shell is provided in a central region between two hinges of a hinge arrangement on the door shell.

* * * * *